US012601427B2

(12) United States Patent
Braga

(10) Patent No.: US 12,601,427 B2
(45) Date of Patent: Apr. 14, 2026

(54) JOINT SYSTEM BETWEEN FITTINGS AND PIPES

(71) Applicant: VIR VALVOINDUSTRIA ING. RIZZIO S.P.A., Valduggia (IT)

(72) Inventor: Marco Braga, Borgosesia (IT)

(73) Assignee: VIR VALVOINDUSTRIA ING. RIZZIO S.P.A., Valduggia (IT)

( * ) Notice: Subject to any disclaimer, the term of this patent is extended or adjusted under 35 U.S.C. 154(b) by 0 days.

(21) Appl. No.: 18/842,247

(22) PCT Filed: Mar. 1, 2023

(86) PCT No.: PCT/EP2023/055180
§ 371 (c)(1),
(2) Date: Aug. 28, 2024

(87) PCT Pub. No.: WO2023/166056
PCT Pub. Date: Sep. 7, 2023

(65) Prior Publication Data
US 2025/0180144 A1 Jun. 5, 2025

(30) Foreign Application Priority Data

Mar. 2, 2022 (IT) ......................... 102022000003905

(51) Int. Cl.
F16L 13/14 (2006.01)
(52) U.S. Cl.
CPC .......... F16L 13/142 (2013.01); F16L 13/141 (2013.01); F16L 13/148 (2013.01); F16L 2201/10 (2013.01)

(58) Field of Classification Search
CPC ... F16L 13/148; F16L 2201/10; F16L 13/142; F16L 13/141
See application file for complete search history.

(56) References Cited

U.S. PATENT DOCUMENTS

| | | | |
|---|---|---|---|
| 6,581,983 B1 | 6/2003 | Viegener | |
| 7,475,918 B2 * | 1/2009 | Kaimer | ................. F16L 13/148 |
| 9,188,260 B2 | 11/2015 | Spence | |
| 2007/0246938 A1 * | 10/2007 | Webb | .................... F16L 13/148 |

(Continued)

FOREIGN PATENT DOCUMENTS

| | | |
|---|---|---|
| DE | 29813935 U1 | 10/1998 |
| DE | 10044675 A1 | 3/2002 |

(Continued)

*Primary Examiner* — William S. Choi
(74) *Attorney, Agent, or Firm* — FisherBroyles, LLP; Roger L. Browdy; James E. Mrose

(57) ABSTRACT

In a press-fit joint system for tight connection between a pocket provided at an open end of a fitting or valve and an open end of a pipe, the pocket of the fitting or valve slidably accommodates the pipe and has an annular seat projecting outwardly that accommodates a compressible ring seal, wherein the connection is formed by imparting a plastic deformation to the a pair formed by the pocket and the pipe, and compressing the ring seal, wherein the ring seal has one or more channels with an upstream opening and a downstream opening such as to allow a passage of fluid from an inside of the system to an outside prior to proper pressing between the pipe and the fitting or valve and to occlude and to prevent the passage of fluid upon application of proper pressing between pipe and fitting or valve.

7 Claims, 6 Drawing Sheets

(56) References Cited

U.S. PATENT DOCUMENTS

| | | | | |
|---|---|---|---|---|
| 2010/0148495 | A1* | 6/2010 | Glaze | F16L 13/142 |
| 2021/0062944 | A1* | 3/2021 | Lee | F16L 13/142 |

FOREIGN PATENT DOCUMENTS

| | | | |
|---|---|---|---|
| DE | 10118955 | A1 | 10/2002 |
| JP | 2004108448 | A | 4/2004 |
| WO | 9854500 | A1 | 12/1998 |
| WO | 2004068018 | A1 | 8/2004 |

* cited by examiner a)          b)          c)

JOINT SYSTEM BETWEEN FITTINGS AND PIPES

The present invention refers to joint systems between fittings and pipes in a hydraulic or pneumatic system. In particular, the present invention concerns a joint system of the "press-fit" type.

BACKGROUND OF THE INVENTION

In recent years, a type of connection between fittings/valves (typically in metal alloys) and pipes of hydraulic/pneumatic systems has become widespread in hydraulic and pneumatic systems, which is carried out by means of "press-fit" terminals. Basically, the pipe (generally, but not exclusively, in copper or steel) to which the fitting/valve is to be connected is inserted, by sliding it manually, into a suitable pocket of the terminal where there is a seat inside which a rubber seal is accommodated, normally in the form of a toroidal O-ring (but also of different section).

FIG. 1 is a schematic view showing in section such a joint of the press-fit type that occurs between the pocket 113 of a fitting 111 and a pipe 112. An annular seat 115 projected outwardly intended to accommodate an O-ring 50 is provided on the pocket 113.

The connection is perfected by imparting a plastic deformation to the pocket/pipe pair by means of suitable pressing tools. The compression and consequent deformation have a double function: on the one hand, to deform the cylindrical portions of the pocket and pipe so that the geometric alterations and/or the localised constriction can prevent the latter from slipping off when stressed by the internal pressure or by external loads of the system; on the other hand, they have the function of compressing the rubber of the seal so that it is pressed against the surfaces of pipe and seat preventing the fluid contained by the system from leaking to the outside.

Since the internal pressure imposed during the final testing of a system made in whole or in part by means of press-fit connections tends to compress and therefore to spontaneously engage the seals, it is possible that a connection looks "sealed" even if it has not been deformed by pressing yet: such a connection could leak during the subsequent steady operation of the system due to pressure variations, vibrations and so on. All this renders the system itself ineffective and could lead to significant damages manifesting themselves by the time the rooms crossed by the pipes have been inhabited and/or filled with all kinds of things that will get damaged once they are reached by the fluid.

In the context just described, to overcome this problem, the tendency to modify the press-fit terminals has spread on the market such that, if not pressed, they allow a safe leakage of fluid from the inside of the system to the outside. In this way, when the finished system is put under pressure for the final check, if the installers have forgotten to press any connection, this defect will be made evident by the decrease in the test pressure and any unpressed terminals will be identified more easily (e.g. due to the presence of drops/stains of liquid or bubbles in a foam solution sprayed on the terminals for gaseous fluids).

There is therefore a need for a system that purposely leaks in a connection that has not been properly pressed. Some attempts have also been made to provide specialized O-ring designs that deliberately allow the leakage until the moment in which proper pressing is performed. The ways in which the press-fit connections are modified have been the subject of various patents and patent applications, including for example DE10044675, U.S. Pat. No. 6,581,983B1, DE10118955 and U.S. Pat. No. 9,188,260B2.

It should be noted that all local modifications of the sections of the seals according to the prior art, made to create by-pass channels through which the fluid conveyed by the system can escape from the non-pressed connections avoiding the phenomenon of automatic engagement under the test pressure, are located on the outer or inner periphery (at points 108 and 109 in FIG. 1) of the section of the seal.

However, these peripheries are home to multiple possible defects due to the closure of the two half-moulds with which the seals are obtained.

Wear on the plane of contact between the two half-moulds, for example, creates burr protrusions, wear of the sliding guides for approaching the two half-moulds creates decouplings that cause even worse "mismatch" defects, wear of the moulds can generate geometries with excess material, modification of the geometry that reduces even more the ducts of passage of the fluid and excessive deburring can eliminate the ducts themselves.

All the defects officially identified on the international standards relating to the O-rings are situated precisely at points 108 and 109 of FIG. 1, where the interaction between the modified seals referred to in the state of the art, the seat of the seal and the pipe is provided and where their single relevance, or worse, their simultaneous, and thus synergistic, presence can affect the correct functioning of the solutions currently in use.

From the above, it is clear that the seals of this type still present critical issues that can cause serious inconvenience to the hydraulic or pneumatic systems to which they are applied.

SUMMARY OF THE INVENTION

Therefore, the object of the present invention is to provide a joint system between fittings or valves and pipes in a hydraulic or pneumatic system by means of "press-fit" connections capable of overcoming the disadvantages listed above of the prior art.

In particular, the object of the present invention is to provide a joint system provided with an improved ring seal capable of ensuring a controlled leakage of fluid when the components have not been adequately pressed, avoiding any automatic engagement phenomenon during final testing.

Another object of the present invention is to provide such a joint system which is versatile and capable of being applied to various configurations of hydraulic and pneumatic systems.

A further object is to provide a more efficient joint system than the prior art which is economical and simple to implement.

These and other objects are achieved by a "press-fit" joint system according to the invention having the features listed in appended independent claim 1.

Advantageous embodiments of the invention appear from the dependent claims.

Substantially, the present invention concerns a "press-fit" joint system for tight connection between a pocket provided at the open end of a fitting or valve and an open end of a pipe in a hydraulic or pneumatic system, the pocket of said fitting or valve being intended to slidably accommodate the pipe to which it is to be connected and having an annular seat projecting outwardly intended to accommodate a compressible ring seal, wherein the connection is perfected by means of suitable pressing tools and at the same time compressing the ring seal so as to be pressed against the surfaces of the pipe and the pocket, wherein said ring seal has one or more channels having an upstream opening and a downstream opening such as to allow a passage of fluid from the inside of the system to the outside in all cases where proper pressing between pipe and fitting or valve has not been applied, and to occlude to prevent the passage of fluid upon application of proper pressing between pipe and fitting or valve.

BRIEF DESCRIPTION OF THE DRAWINGS

Further features of the invention will become clearer from the detailed description that follows, referring to a purely illustrative and therefore non-limiting embodiment thereof, illustrated in the accompanying drawings, wherein:

FIG. 6b is an enlarged view of detail A in FIG. 6a; and

DETAILED DESCRIPTION OF THE INVENTION

Preferred embodiments of joint systems by means of press-fit connection according to the present invention will now be described in detail with reference to the accompanying drawings.

The solution according to the invention envisages making special by-pass channels to allow the leakage of fluid to the outside before pressing, avoiding unwanted engagement phenomena from occurring during final testing.

Figure 1:
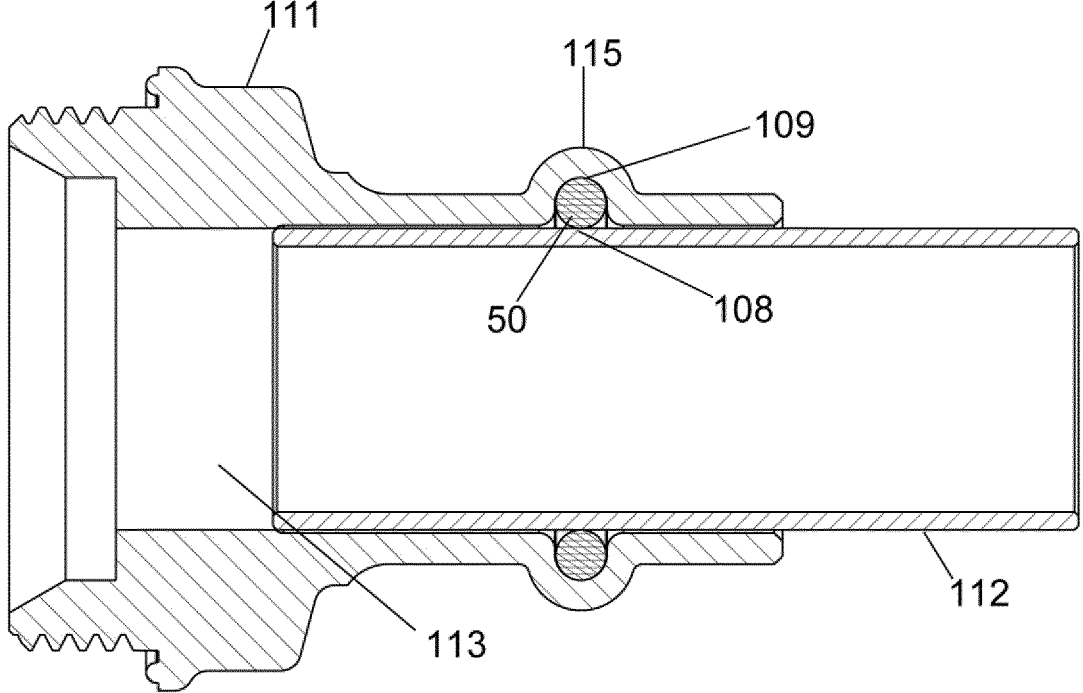
FIG. 1 is a sectional view of a press-fit type joint system having a ring seal according to the prior art, in uncompressed condition.
Figure 2:
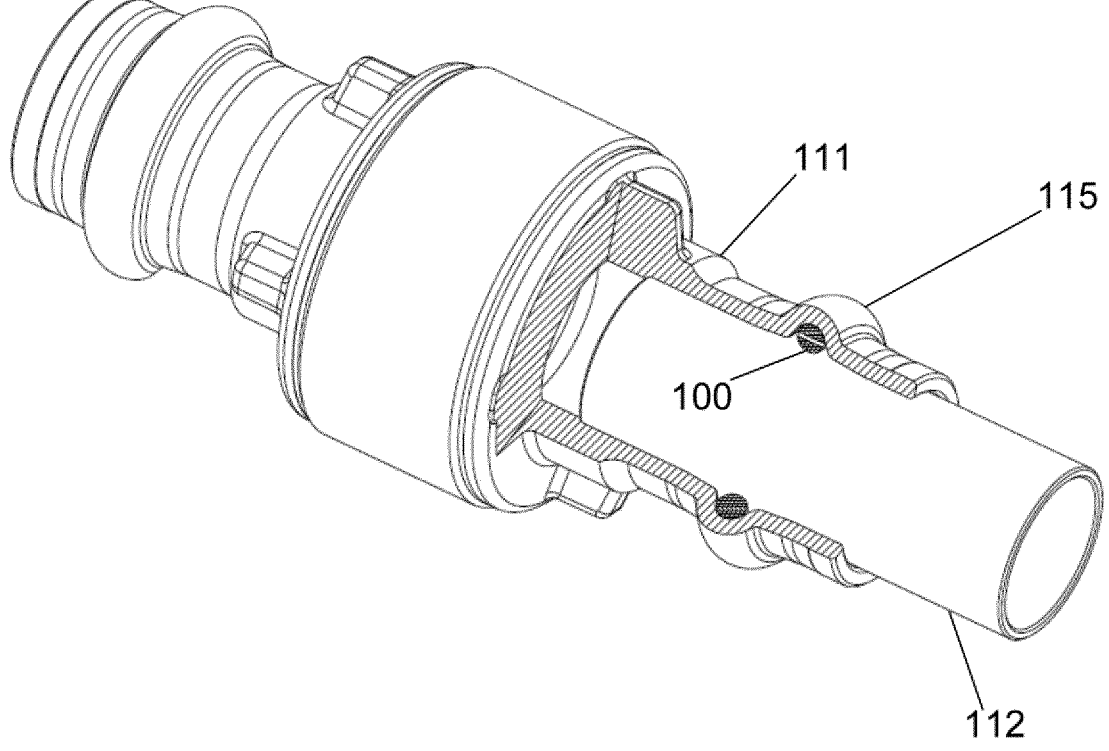
FIG. 2 is a perspective sectional view of a press-fit type joint system having a ring seal according to the present invention, in uncompressed condition.
Figure 3:
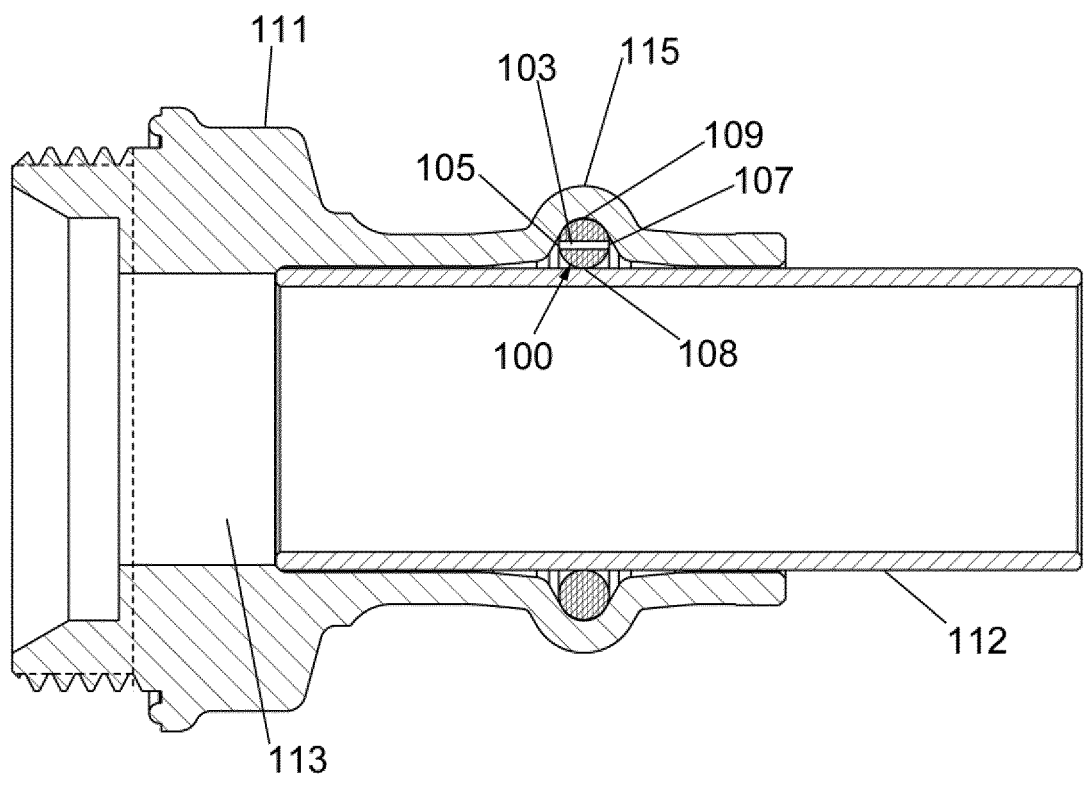
FIG. 3 is a view like that of FIG. 2 in planar section.

FIGS. 2 and 3 show, in a conventional manner, sectional views of a press-fit type joint between a fitting or valve 111 and a pipe 112, which is slidably accommodated in a pocket 113 obtained at one end of the fitting 111. The fitting or valve 111 has an annular seat 115 projecting outwardly which is intended to accommodate a rubber ring seal (O-ring) 100 according to the invention. The views show the configuration of the joint before the components are pressed together and the ring seal is deformed by means of appropriate pressing tools.

Figure 3A:
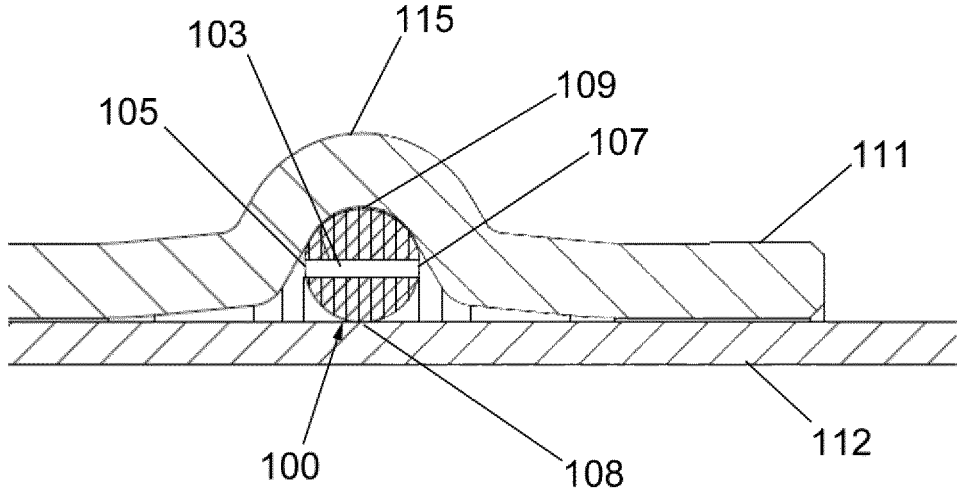
FIG. 3a is an enlargement of the view of FIG. 3 at the ring seal.

FIG. 3a shows a detail of an embodiment according to the invention, showing a section of a seal 100 with a channel or duct 103 having upstream opening 105 and a downstream opening 107 to allow a flow of fluid even when the seal is pushed into contact with the inner walls of the annular seat 105 and of the pipe 112 in the vicinity of the peripheries 108 and 109 by the test pressure of the system without there having been an effective and complete compression of the terminals. Upon application of a suitable joint pressure, the joint portions will plastically deform in turn compressing the seal 100 causing at the same time the occlusion of the channels 103 of the ring seal 100, thereby rendering the joint fluid tight.

Figure 6:
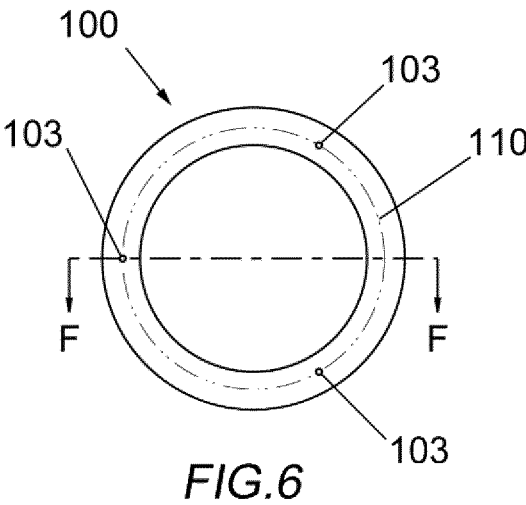
FIG. 6 is a front view of a seal ring according to the present invention.

The channels 103 may be provided in different number and shape on the seal 100. In the embodiment of FIG. 3a a channel 103 is shown with a straight development between the upstream opening 105 and the downstream opening 107, which thus presents itself in the form of a longitudinal cylindrical channel that is obtained through the thickness of the ring 100 in a direction substantially parallel to the axis of the pipe 112. FIG. 6 shows a particular embodiment of the ring seal 100 formed by three longitudinal channels 103 obtained in the thickness thereof.

Figure 6A:
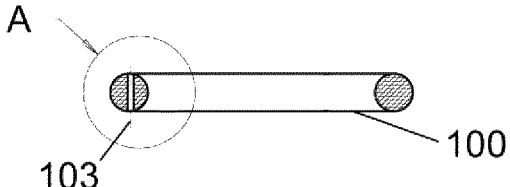
FIG. 6a is a sectional view taken along line F-F of FIG. 6.
Figure 6B:
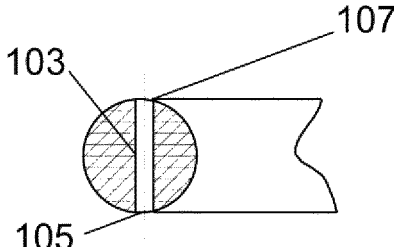

FIG. 6 is a front view of a ring 100 with three channels 103 arranged radially at angles of 120° from the center on an intermediate circumference 110 between the peripheries 108 and 109 of the ring. FIG. 6a is a section taken along line F-F of FIG. 6, while FIG. 6b is an enlargement of detail A of FIG. 6a. This configuration turned out to be advantageous to uniformly cover the various points of the seal and ensure a balance of the leakages by optimizing the possibilities of having safe and open by-pass channels before pressing without an excessive number of them, thus also optimizing their occlusion as a result of pressing the joint.

The invention thus provides for allowing the leakage of fluid to the outside before pressing by means of by-pass channels 103 in which the upstream 105 and downstream 107 openings of the channels are positioned inside the vertical section (with reference to FIG. 6) of the seal 100 and not at its peripheral points 108 and 109.

In doing so, all the macroscopic defects described above continue to be positioned at the points 108 and 109, and are now irrelevant for the proper functioning of the bypass channels 103.

The one shown in FIGS. 6, 6a and 6b is only one of the preferred embodiments, it being understood that the channels provided on the seal rings depending on the applications and system requirements can vary in number, section, trajectory and positioning along the section of the rubber seal, always remaining positioned inside the section (also not necessarily of circular shape) and not in its peripheral points 108 and 109.

Compared to the known solutions, in fact, the ring seals can have channels 103 positioned so as to be much further away from the walls of the seat 115 of the seal and from the pipe 112 and, considering their great efficiency in allowing the by-pass flow derived from their structure, they can be made with very small flow sections. This directly entails both the minimization of the size of the possible defects (any burrs near the upstream 105 and downstream 107 openings of the channels, any deviations in the trajectory of the channels) and the minimization of the variety of types of the same defects, as well as their possible synergistic action.

Figure 4:
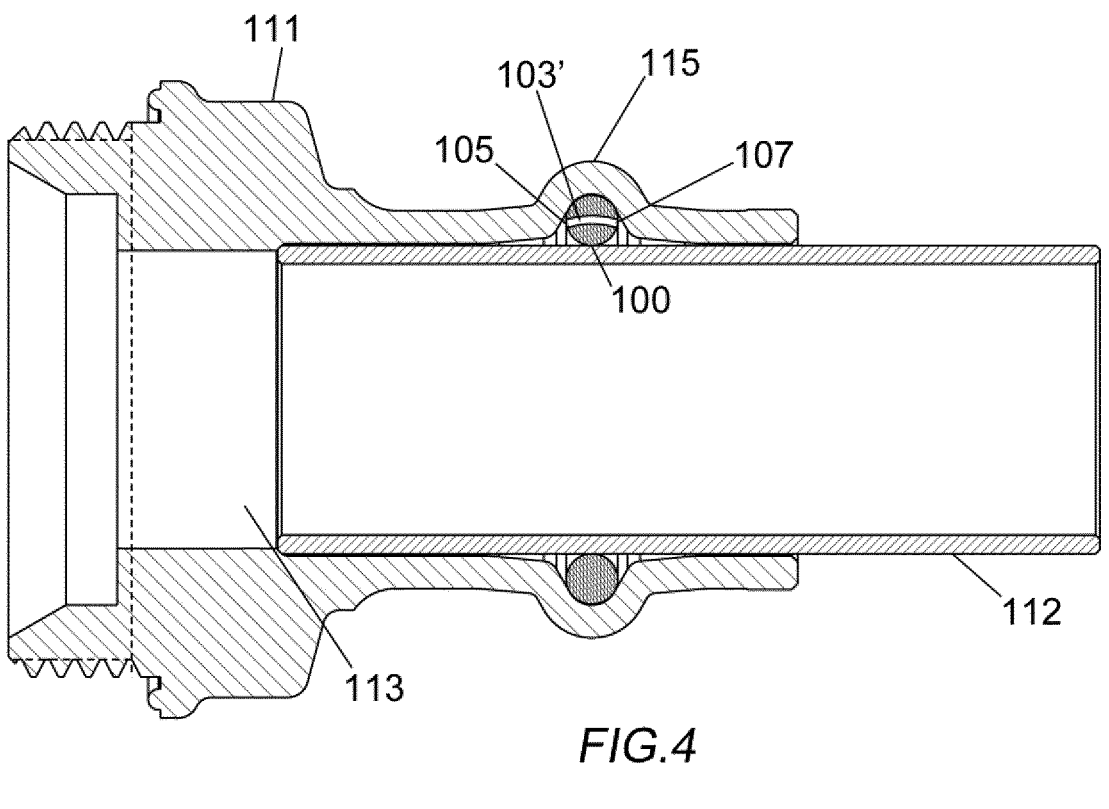
FIG. 4 is a sectional view of a press-fit type joint system showing a second embodiment of a seal ring according to the present invention, in uncompressed condition.
Figure 4A:
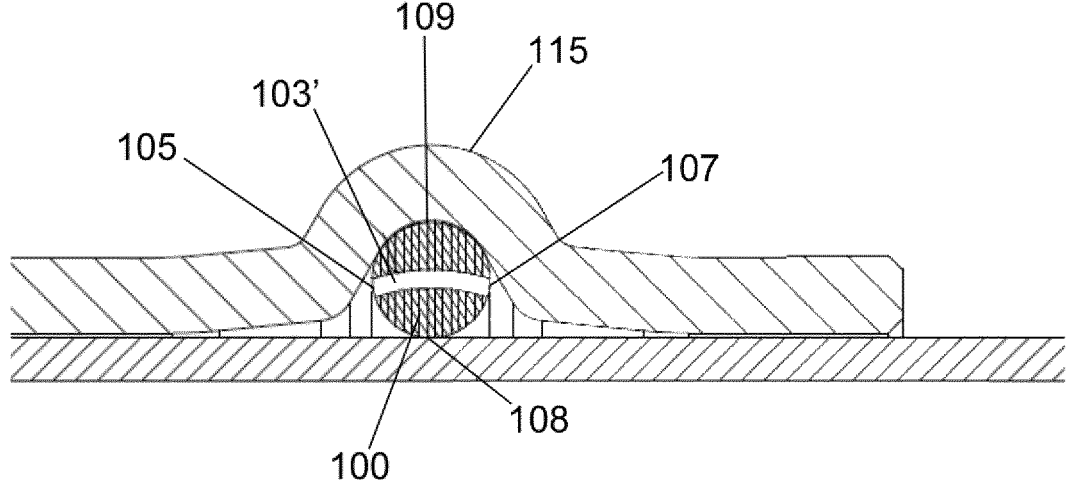
FIG. 4a is an enlargement of the view of FIG. 4 at the ring seal.

FIGS. 4 and 4a show a joint with a ring seal 100 provided with a channel 103' extending with a curvilinear trajectory along the thickness of the ring between an upstream opening 105 and a downstream opening 107 to optimize the interaction with the walls of the seat 115 of the seal.

Figure 5:
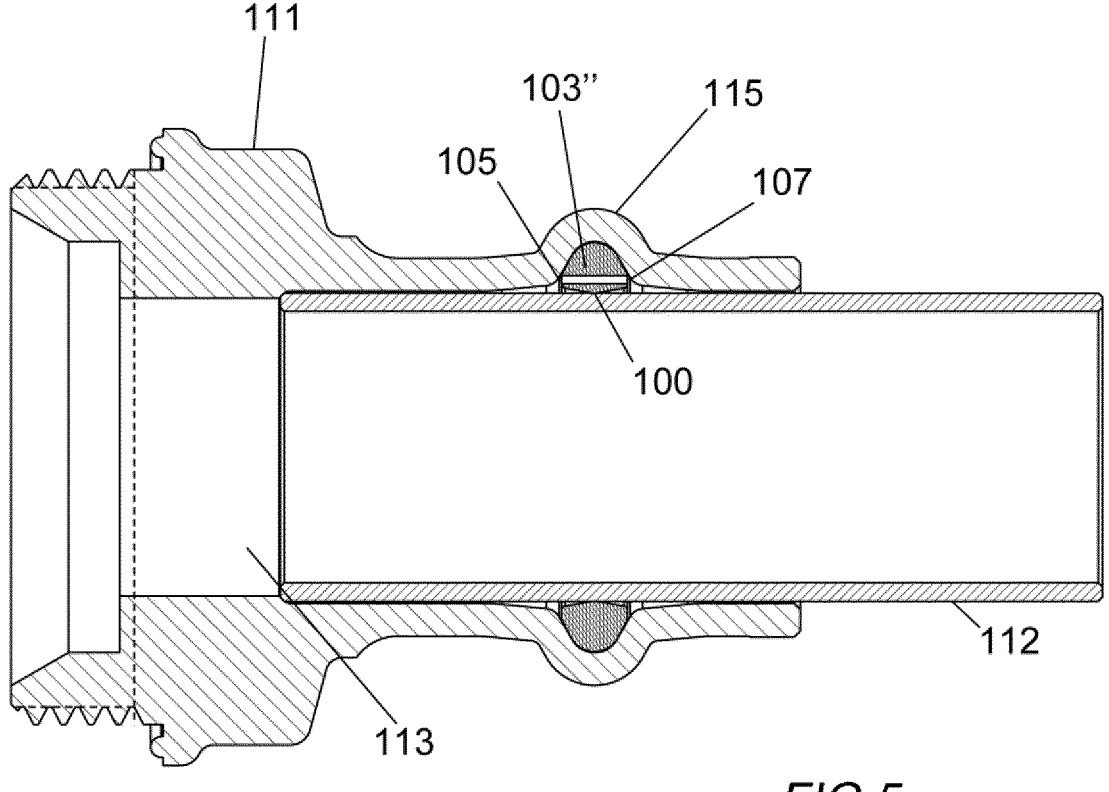
FIG. 5 is a sectional view of a press-fit type joint system showing a third embodiment of a ring seal according to the present invention, in uncompressed condition.
Figure 5A:
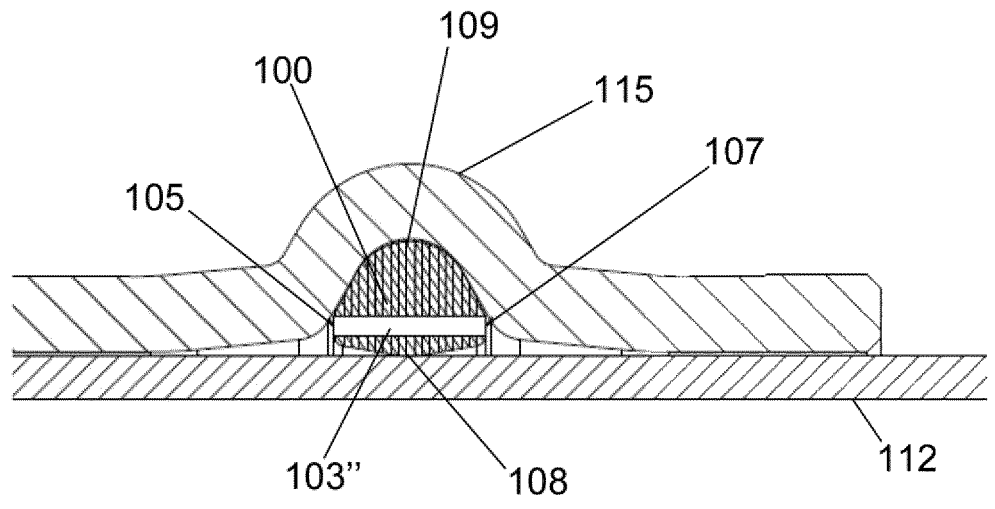
FIG. 5a is an enlargement of the view of FIG. 5 at the ring seal.

FIGS. 5 and 5a instead show a ring seal 100 with a non-circular shaped cross-section, with a predominantly flat lower zone and a curvilinear upper zone, so as to better conform to the annular seat 115. In such a configuration, the channels 103" are arranged so as to be closer to the outer diameter of the pipe 112 than to the surface of the annular seat 115, optimizing the by-pass flow through the channels 103" prior to pressing and the occlusion efficacy thereof following pressing.

As anticipated, such configurations are not limiting, and a ring seal could have a variable number of channels arranged with different trajectories and positions with respect to the median plane, as needed, to optimize the leakage effect before pressing and the sealing effect after compression.

Figure 7:
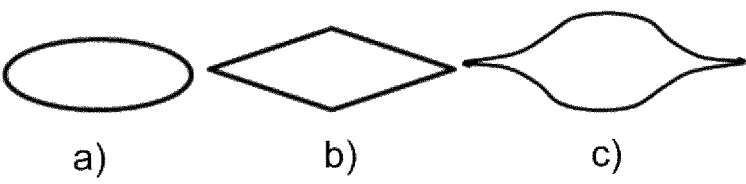
FIG. 7 schematically shows three exemplary sections of channels of non-circular shape.

Finally, it should be noted that the sections of the upstream 105 and downstream 107 openings can also be of various types, and not necessarily circular. FIG. 7 shows, for example, a) elliptical, b) rhomboidal and c) spindle-shaped sections that could always optimize sealing after pressing.

The present invention is not limited to the particular embodiments previously described and illustrated in the accompanying drawings, but numerous modifications can be made to it in detail, within the reach of the person skilled in the art, without thereby departing from the scope of the invention itself, as defined in the appended claims.

The invention claimed is:

1. A press-fit joint system for tight connection between a pocket provided at an open end of a fitting or valve and an open end of a pipe in a hydraulic or pneumatic system, the press-fit joint system comprising:

the fitting or valve, the pocket of said fitting or valve being configured to slidably accommodate the pipe to which it the pocket is to be connected and having an annular seat projecting outwardly that accommodates a compressible ring seal, wherein the connection of the pocket and the pipe is formed by imparting a plastic deformation to a pair formed by the pocket and the pipe, and at the same time compressing the ring seal so as to be pressed against surfaces of the pipe and the pocket, and the compressible ring seal, wherein said ring seal has one or more channels having an upstream opening and a downstream opening such as to allow a passage of fluid from an inside of the press-fit joint system to an outside prior to proper pressing between the pipe and the fitting or valve, and to occlude and to prevent the passage of fluid upon application of proper pressing between pipe and fitting or valve;

said one or more channels having a curvilinear fluid path along the thickness of the ring seal between said upstream opening and said downstream opening.

2. The joint system of claim 1, wherein a cross-section of the ring seal is circular.

3. The joint system according to claim 2, wherein said ring seal comprises three channels arranged radially at angles of 120° from a center.

4. The joint system according to claim 1, wherein a cross-section of the ring seal has a non-circular shape, having a predominantly flat lower section configured to be applied at an outer surface of the pipe and a curvilinear upper section configured to be applied at the annular seat of the pocket.

5. The joint system according to claim 1, wherein said one or more channels are obtained in an area of the ring seal, with reference to a vertical section of the ring seal, which is to be positioned closer to the surface of the pipe than to the annular seat.

6. The joint system according to claim 1, wherein sections of the upstream and downstream openings of said one or more channels are of circular shape.

7. The joint system according to claim 1, wherein sections of the upstream and downstream openings of said one or more channels are non-circular in shape consisting of one of elliptical, rhomboidal and spindle-shaped.

\* \* \* \* \*